(12) United States Patent
An

(10) Patent No.: US 6,344,905 B1
(45) Date of Patent: Feb. 5, 2002

(54) APPARATUS AND A METHOD FOR DIALING AND PRINTING A TELEPHONE NUMBER OF A TRANSMISSION-SIDE FACSIMILE DEVICE PROVIDED THROUGH AN INTEGRATED SERVICE DIGITAL NETWORK

(75) Inventor: Chung-Mo An, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/216,955

(22) Filed: Dec. 21, 1998

(30) Foreign Application Priority Data

Dec. 20, 1997 (KR) .............................. 97-71380

(51) Int. Cl.$^7$ .............................. H04N 1/00; H04N 1/40
(52) U.S. Cl. .................. 358/440; 358/400; 379/100.01
(58) Field of Search .................. 358/400, 404, 358/468, 401, 440, 444, 479; 379/100.01, 100.06, 100.09

(56) References Cited

U.S. PATENT DOCUMENTS 5,422,733 A * 6/1995 Merchant .................... 358/407
5,920,826 A * 7/1999 Metso ......................... 455/557
6,178,446 B1 * 1/2001 Gerszberg .................... 709/217

FOREIGN PATENT DOCUMENTS

GB          464610 A2  *  6/1991  ............ H04M/1/57

* cited by examiner

Primary Examiner—Jerome Grant, II
(74) Attorney, Agent, or Firm—Robert E. Bushnell, Esq.

(57) ABSTRACT

Disclosed are an apparatus and a method for dialing and printing a telephone number of a transmission-side facsimile device provided through an integrated services digital network (ISDN). According to an aspect of the present invention, a reception-side facsimile device stores the telephone number of the transmission-side facsimile device provided through the integrated services digital network. The reception-side facsimile device can dial the telephone number of the transmission-side facsimile device when transferring facsimile data and also prints the telephone number of the transmission-side facsimile device if necessary. Accordingly, the facsimile device according to the present invention is convenient because the user does not have to dial the telephone number of the transmission-side facsimile device.

20 Claims, 7 Drawing Sheets

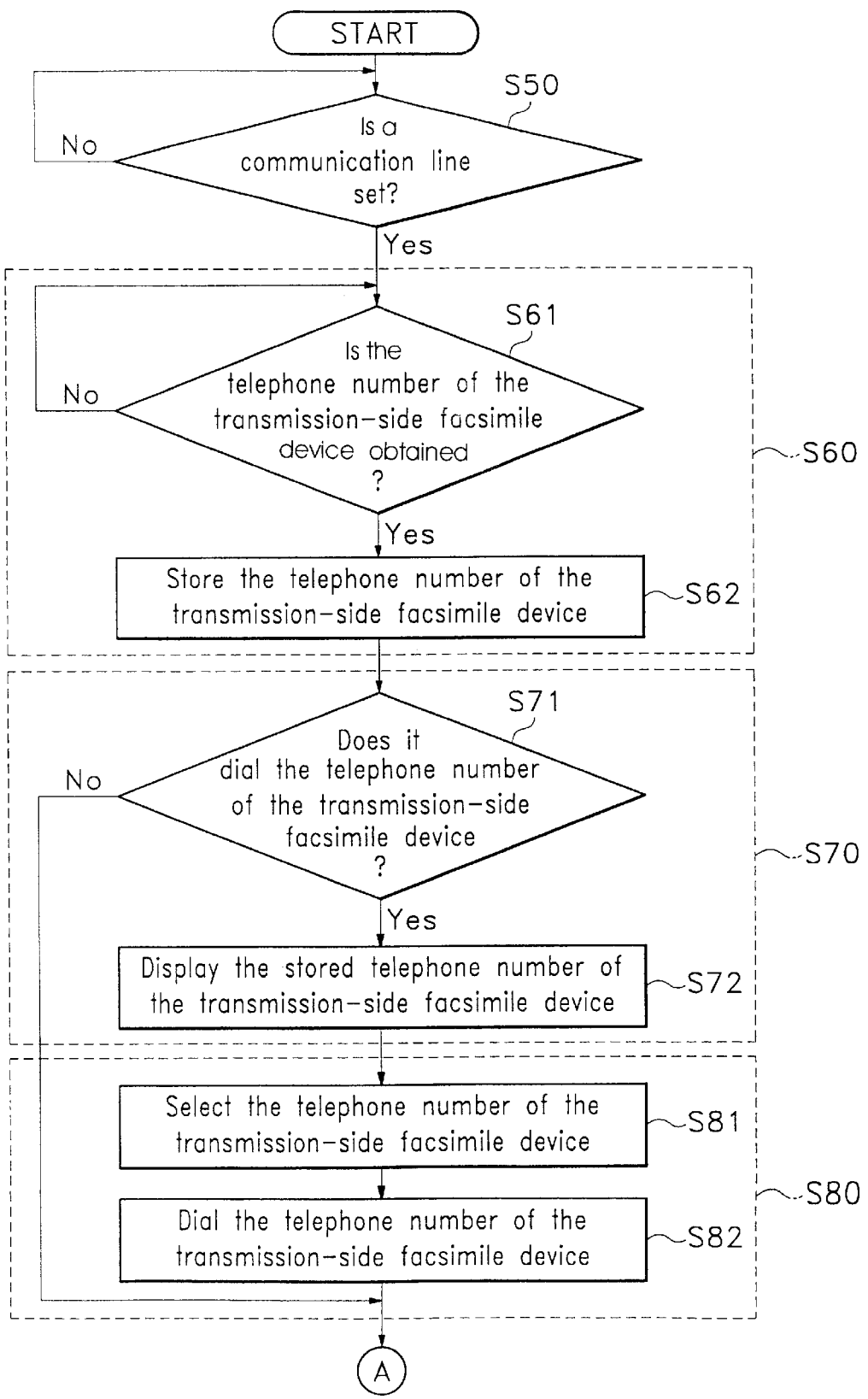

FIG. 7

| | |
|---|---|
| 0 | 1234567 |
| 1 | 2345678 |
| 2 | 3456789 |
| 3 | 4567890 |
| 4 | 5678901 |
| 5 | 6789012 |
| 6 | 7890123 |
| ⋮ | |
| n−3 | |
| n−2 | |
| n−1 | |
| n | |

# APPARATUS AND A METHOD FOR DIALING AND PRINTING A TELEPHONE NUMBER OF A TRANSMISSION-SIDE FACSIMILE DEVICE PROVIDED THROUGH AN INTEGRATED SERVICE DIGITAL NETWORK

CLAIM OF PRIORITY

This application makes reference to, incorporates the same herein, and claims all benefits accruing under 35 U.S.C. § 119 from an application entitled AN APPARATUS AND A METHOD FOR DISPLAYING CALLING NUMBER AND FOR DIALING USING CALLING NUMBER BE PROVIDED IN ISDN earlier filed in the Korean Industrial Property Office on the 20th day of Dec. 1997, and there duly assigned Serial No. 97-71380, a copy of which is annexed hereto.

BACKGROUND OF THE INVENTION

1. Technical Field

The present invention relates to a device for dialing and outputting a telephone number of a transmission-side facsimile device, and more particularly to a device for dialing and outputting a telephone number of a transmission-side facsimile device through an integrated services digital network.

2. Related Art

Facsimile machines enable people to transmit pages of information to one another rapidly. A user can transmit information from an original document at a first location to a second location through a standard telephone line, with the use of facsimile technology. To accomplish this, the user utilizes a touch pad on a first facsimile system at the first location to dial up a second facsimile system at the second location. This operation is similar to dialing a telephone number on a telephone set.

The user then slides the original document into the first facsimile system's scanner, and the document curls around a drum in front of a photodetector. The first facsimile system scans the image on the surface of the document as a series of lines, takes the lines one at a time, and then appends all of the lines scanned from the document to form a continuous stream of information. The first facsimile system converts this stream of information into a series of modulated tones for transmission over the telephone line. After making a connection with the second facsimile system at the second location, the first facsimile system transmits the series of modulated tones to the second facsimile system. Then the second facsimile system converts the series of modulated tones into dots representing the original image from the original document. A printer within the second facsimile system forms an image onto a sheet of paper at the second location, thereby completing the transmission of information from the original document at the first location to the second location.

The standard telephone line mentioned above is used to convey facsimile data in an analog form. Conversely, the integrated services digital network (ISDN) described below can be used to convey facsimile data in a digital form. The integrated services digital network is an internationally supported standard that might eventually replace standard analog telephone connections.

An integrated services digital network (ISDN) is one network that is capable of conveying voice and multimedia data. Furthermore, the integrated services digital network converts the voice, characters, and image data, which are transferred through a public switched telephone network, a public switched data network, a network for telex, and a private network for facsimile data, into digital data and transfers them through a single network.

The public switched telephone network in an analog way supplies one channel for the voice while the integrated services digital network in a digital way supplies two channels so that users can communicate with each other by a telephone with transferring facsimile data. That is, even if the users do not utilize the private network to use various communication service, the users can communicate with each other and transfer the image data through the integrated services digital network.

Furthermore, since the digital signal is used in the integrated services digital network, there is an advantage in that there is no noise in the integrated services digital network. In addition, less data is lost in the integrated services digital network than in other networks. Also, data can be transferred at high rates of speed in the integrated services digital network.

A facsimile system can be incorporated into a multifunctional machine which includes a scanner, a facsimile machine, a printer, and a copier. The multifunctional machine can be connected to a computer system.

Computer systems that are driven to present combinations of moving and still pictures, sound, music, and words, are pervasive in the industrialized world. Concurrent with the development of computer systems, peripheral equipment including image formation equipment such as printers, have been incrementally modified to provide various functions. A multifunctional machine, employing an ink-jet mechanism and serving as a facsimile and scanner, can be coupled to an external personal computer that performs a user-selected program and generates print data.

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together.

Hereinafter, a multifunctional apparatus having a facsimile transferring function will be described. Generally, the multifunctional apparatus is referred to as a terminal in which a facsimile device, a scanner, a printer, and a copier are incorporated, in other words, a peripheral having multiple functions, which has a function for interfacing with a computer.

When the multifunctional apparatus is connected to the integrated services digital network to be used for communicating with another facsimile device or another multifunctional apparatus, there is an inconvenience in that the user must dial a telephone number of a reception-side facsimile device to transfer data.

Moreover, there is another disadvantage in that the user always must remember or record a telephone number or a facsimile number of the reception-side user in order to transfer facsimile data using the multifunctional apparatus and to communicate with another user by a telephone.

SUMMARY OF THE INVENTION

The present invention has been made to overcome the above described problems of the related art.

It is an object of the present invention to provide an apparatus and a method for dialing and printing a telephone number of a transmission-side facsimile device, which is provided through an integrated service digital network, to a multifunctional apparatus, in which the user need not dial the telephone number of the reception-side facsimile device.

It is another object of the present invention to provide an apparatus and a method for dialing and printing a telephone number of a transmission-side facsimile device, in which the user can facilitate to manage information for another users.

To accomplish the above objects of the present invention, according to an aspect of the present invention, there is provided an apparatus for dialing and printing a telephone number of a transmission-side facsimile device provided through an integrated service digital network, comprising: a memory for storing the telephone number of the transmission-side facsimile device in a desired type of data, the telephone number being provided through the integrated service digital network; a display panel for displaying the telephone number of the transmission-side facsimile device stored in the memory; means for selecting the telephone number of the transmission-side facsimile device displayed on the display panel; a printer for printing the telephone number of the transmission-side facsimile device stored in the memory; a controller for generating a dialing signal for dialing the telephone number of the transmission-side facsimile device displayed on the display panel according to an input signal of the selecting means and a control signal for outputting the telephone number of the transmission-side facsimile device stored in the memory to the printer.

The selecting means preferably comprises: a mode selector for selecting a mode of using the telephone number of the transmission-side facsimile device stored in the memory; a telephone number selector for selecting the telephone number of the transmission-side facsimile device displayed on the display panel after selecting the mode of using the telephone number of the transmission-side facsimile device; a dialing section for dialing the telephone number of the transmission-side facsimile device selected by the telephone number selector; and a cancel section for canceling the dialing of the telephone number of the transmission-side facsimile device.

According to another aspect of the present invention, there is provided a method for dialing and printing a telephone number of a transmission-side facsimile device provided through an integrated service digital network, comprising the steps of; determining whether a communication line is set to be connected to the integrated service digital network, or not; storing the telephone number of the transmission-side facsimile device provided through the integrated service digital network in a desired type of data, when the communication line is set to be connected to the integrated service digital network; displaying the telephone number of the transmission-side facsimile device which is stored; selecting and dialing the desired telephone number of the transmission-side facsimile device; and printing the stored telephone number of the transmission-side facsimile device. Preferably, the telephone number of the transmission-side facsimile device is stored in a type of American standard code for information interchange (ASCII).

The method for dialing and printing the telephone number of the transmission-side facsimile device through the integrated service digital network further comprises a step of canceling the dialing of the telephone number of the transmission-side facsimile device, wherein the step for canceling the dialing of the telephone number of the transmission-side facsimile device is performed when a signal for canceling the dialing of the telephone number is inputted.

To achieve these and other objects in accordance with the principles of the present invention, as embodied and broadly described, the present invention provides an apparatus, comprising: a memory storing a first telephone number corresponding to a first remote facsimile device, the first telephone number being transmitted from the first remote facsimile device to said memory through an integrated services digital network, and said memory storing a plurality of additional telephone numbers corresponding to a respective plurality of additional remote facsimile devices; a video display conveying varying visual information to a user, said visual information including the first telephone number corresponding to the first remote facsimile device stored in said memory; a selector unit selecting the first telephone number displayed on said video display and outputting a selection signal corresponding to the first telephone number; an image formation unit recording the first telephone number onto a recordable medium; and a control unit outputting a dialing signal for dialing the first telephone number when said selection signal corresponding to the first telephone number is received, and said control unit selectively outputting a control signal to said image formation unit for recording the first telephone number on the recordable medium.

To achieve these and other objects in accordance with the principles of the present invention, as embodied and broadly described, the present invention provides a method, comprising: determining when a communication line is set to be connected to an integrated services digital network; storing a first telephone number corresponding to a first remote facsimile device when said communication line is set to be connected to the integrated services digital network, the first telephone number being transmitted from the first remote facsimile device through the integrated services digital network; displaying the first telephone number at a video display conveying varying visual information to a user, said visual information including the first telephone number; selecting and dialing the first telephone number; and printing the first telephone number.

To achieve these and other objects in accordance with the principles of the present invention, as embodied and broadly described, the present invention provides an apparatus, comprising: a memory storing a first telephone number corresponding to a first remote facsimile device, the first telephone number being transmitted from the first remote facsimile device to said memory through an integrated services digital network, and said memory storing a plurality of additional telephone numbers corresponding to a respective plurality of additional remote facsimile devices; a video display conveying varying visual information to a user, said visual information including the first telephone number corresponding to the first remote facsimile device stored in said memory, and said visual information including said plurality of additional telephone numbers; a selector unit selecting the first telephone number displayed on said video display and outputting a selection signal corresponding to the first telephone number, said selector unit selecting the first telephone number from among said first telephone number and said plurality of additional telephone numbers; and a control unit outputting a dialing signal for dialing the first telephone number when said selection signal corresponding to the first telephone number is received.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

FIGS. 6A and 6B constitute a flowchart showing a process of dialing and outputting the telephone number of the transmission-side facsimile device, in accordance with the principles of the present invention; and FIG. 7 is a view showing a memory having the telephone number of the transmission-side facsimile device stored therein, in accordance with the principles of the present invention.

DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Hereinafter, a multifunctional apparatus including an apparatus for dialing and printing a telephone number of a transmission-side facsimile device according to an example of the present invention will be described in detail with reference to the accompanying drawings.

Figure 1:
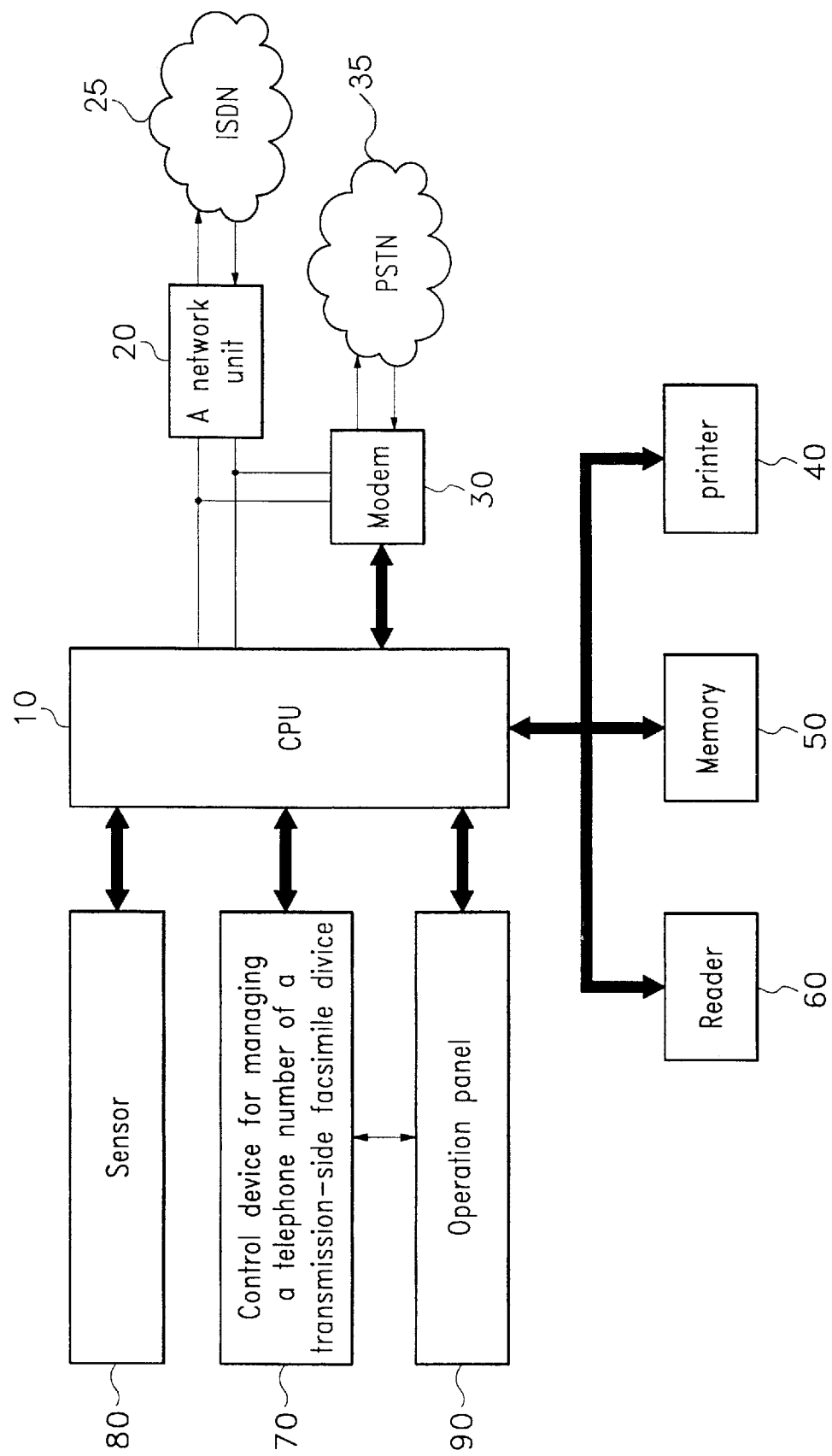
FIG. 1 is a block diagram showing a multifunctional apparatus having a facsimile transferring function, in accordance with the principles of the present invention.

FIG. 1 is a block diagram of a multifunctional apparatus having a facsimile data transferring function. A central processing unit (CPU) 10 controls an entire system according to a program. A memory 50 has program data, protocols, and character data stored therein. An operation panel 90 has a plurality of keys to generate signals to be inputted into the central processing unit 10. The operation panel 90 has a liquid crystal display (LCD) to display indication data from the central processing unit 10. A reader 60 scans and converts image of a document into digital image data, which in turn provides the digital image data for the central processing unit 10. A modem 30 modulates output data from the central processing unit 10 into an analog data and demodulates analog data received through the integrated services digital network (ISDN) 25 to be outputted to the central processing unit 10. The modem 30 is coupled to a public switched telephone network (PSTN) 35.

A network unit 20 operates to interface a signal between the modem 30 and a telephone line according to a control signal of the central processing unit 10, and connects the multifunctional apparatus to the integrated services digital network 25. A printer 40 prints data received through the integrated services digital network 25 according to a control signal of the central processing unit 10. A sensor 80 detects and provides amount of recordable paper remaining in a tray for the central processing unit 10. A managing device 70 for managing the telephone number of the transmission-side facsimile device dials the telephone number of the transmission-side facsimile device provided through the integrated services digital network 25 and prints the telephone number of the transmission-side facsimile device.

Figure 2:
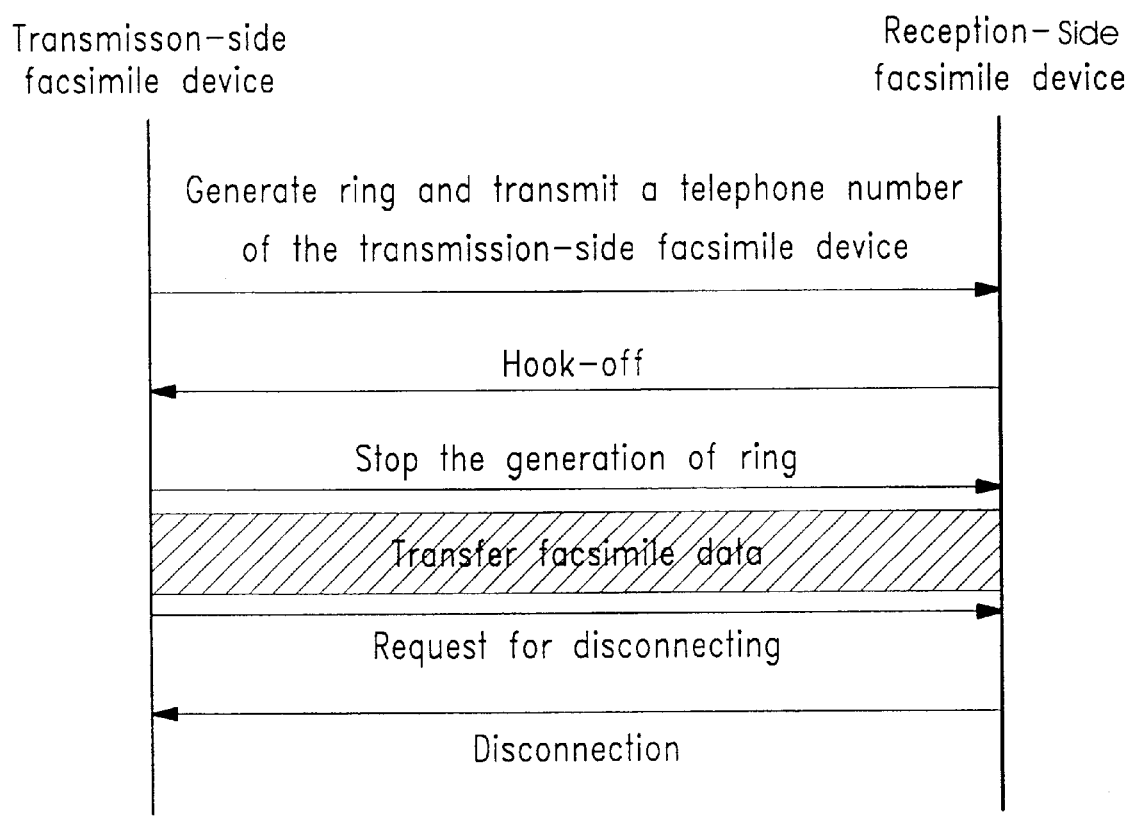
FIG. 2 is a view showing a process of obtaining a telephone number of a transmission-side facsimile device provided through an integrated service digital network, in accordance with the principles of the present invention.

FIG. 2 is a view showing a process of obtaining a telephone number of a transmission-side facsimile device provided through an integrated service digital network according to the present invention. When a transmission-side user generates a ring signal, the ring signal and a telephone number of the transmission-side user are transferred to a reception-side user through the integrated services digital network. When the reception-side user receives the received ring signal, the transmission-side facsimile device stops generation of ring and transfers facsimile data to the reception-side facsimile device.

When the transmission-side facsimile device completes the transfer of the facsimile data, the transmission-side facsimile device requests a disconnection from the reception-side facsimile device. The reception-side facsimile device disconnects the communication from the transmission-side facsimile device.

Figure 3:
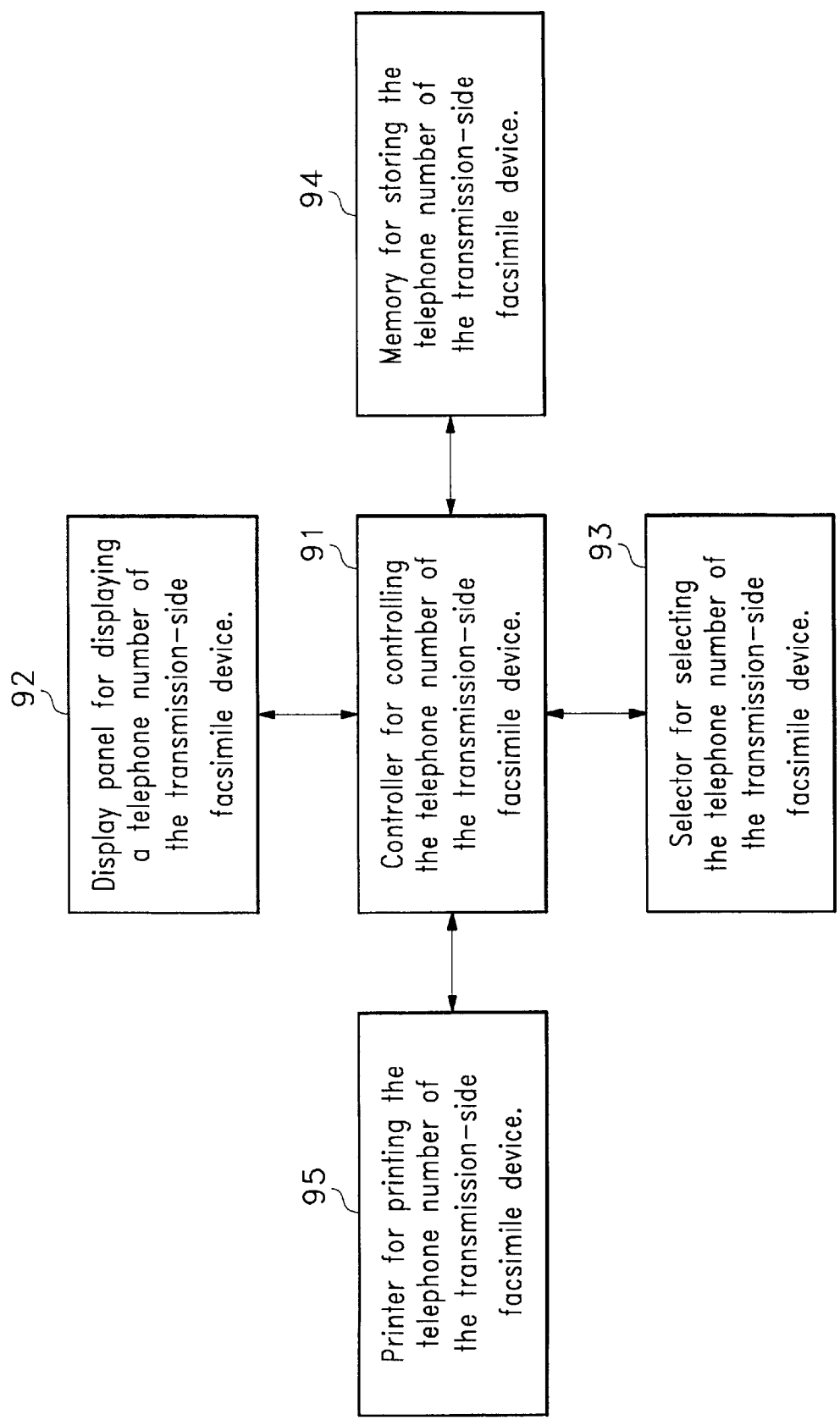
FIG. 3 is a block diagram showing a control device for managing the telephone number of the transmission-side facsimile device in the multifunctional apparatus, in accordance with the principles of the present invention.

FIG. 3 is a block diagram showing a control device for managing the telephone number of the transmission-side facsimile device in the multifunctional apparatus, in accordance with the principles of the present invention. A memory 94 for storing the telephone number of the transmission-side facsimile device has the telephone numbers which are provided from the integrated services digital network. The telephone number is stored in the American standard code for information interchange (ASCII) format or a comparable format.

The telephone numbers of the transmission-side facsimile devices are in sequence stored in the memory 94 in such a manner as shown in FIG. 7. When the number of the telephone numbers exceeds the maximum capability of the memory 94, the telephone numbers are in sequence stored from the first address of the memory 94.

A selector 93 is used to select one telephone number of the transmission-side facsimile device among the telephone numbers to transfer the facsimile data. When the user selects the telephone number of the transmission-side facsimile device, the multifunctional apparatus dials and cancels the selected telephone number. A display panel 92 displays the telephone numbers of the transmission-side facsimile devices stored in the memory 94 thereon. A printer 95 prints the telephone numbers of the transmission-side facsimile devices stored in the memory 94.

A controller 91 generates a control signal for dialing the telephone number of the transmission-side facsimile device when the user selects the telephone number of the transmission-side facsimile device among the telephone numbers displayed on the display panel 92 by using the selector 93 or generates a control signal so that the printer 95 prints the telephone numbers of the transmission-side facsimile devices stored in the memory 94.

Figure 4:
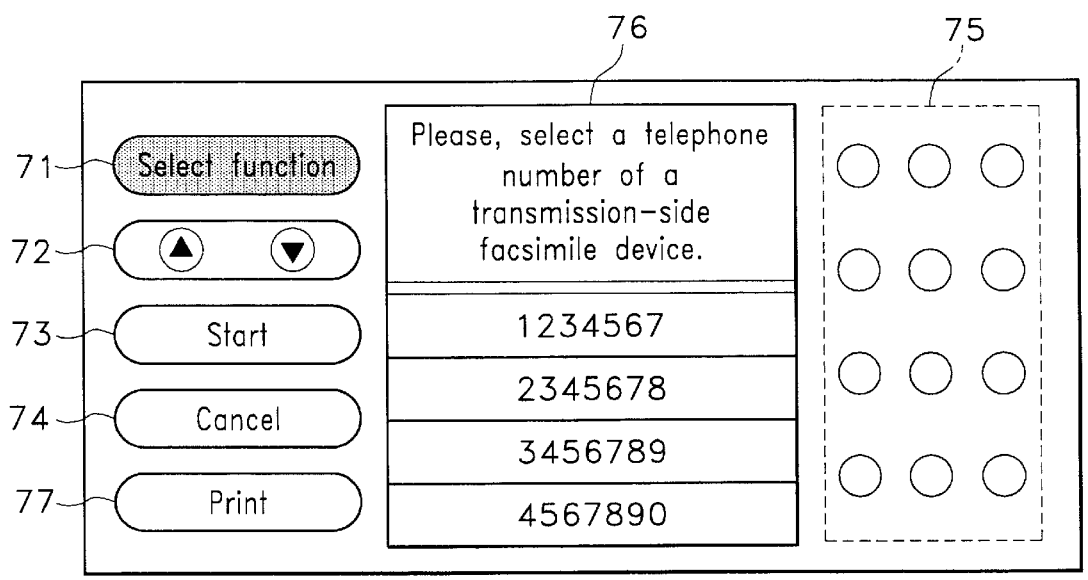
FIG. 4 is a view of an operation panel on the multifunctional apparatus in which an example of dialing the telephone number is illustrated, in accordance with the principles of the present invention.

Hereinafter, a construction of the selector 93 for selecting the telephone number of the transmission-side facsimile device will be described in detail with reference to FIG. 4. The selector 93 includes a key 71 for using the telephone number of the transmission-side facsimile device stored in the memory 94, a key 72 for selecting one of the telephone numbers of the transmission-side facsimile devices which are displayed on the display panel 92 when a signal for selecting the telephone number is inputted to the central processing unit 10 by means of the key 71, a start key 73 for dialing the telephone number of the transmission-side facsimile device selected by the selecting key 72, and a cancel key 74 for canceling the dialing of the telephone number of the transmission-side facsimile device. A print key 77 is used to print. The area 75 is an area which can be used for push buttons corresponding to preset speed dial numbers, or can be used for signal lights such as phone-line-in use signal lights or for signal lights for alert signals and error signals. FIG. 4 shows function keys mounted on the operation panel 90. The reference numerals and components in FIG. 4 correspond to the reference numerals and components in FIG. 5.

Hereinafter, a method for dialing and printing the telephone number of the transmission-side facsimile device provided through the integrated services digital network according to the principles of the present invention will be described in detail with reference to FIGS. 2 to 7. Refer now to the FIGS. 6A and 6B, which constitute a flowchart showing a process of dialing and outputting the telephone number of the transmission-side facsimile device, in accordance with the principles of the present invention.

In FIG. 6A, at step S50, it is determined whether a communication line is set between the multifunctional apparatus and the integrated services digital network. When the communication line is set between the multifunctional apparatus and the integrated services digital network, then step S61 is performed. At step S61, the telephone number of the transmission-side facsimile device is obtained from the integrated services digital network as shown in FIG. 2. At step S62, the telephone numbers of the transmission-side facsimile devices are in sequence stored in the memory 94 in the American standard code for information interchange (ASCII) format or a comparable format.

At step S71, in order to transfer the facsimile data using the telephone number of the transmission-side facsimile device stored in the memory 94, it is determined by the controller 91 whether the signal for selecting one of the telephone numbers of the facsimile devices is inputted by a key 71 shown in FIG. 4. At step S72, when the signal for selecting one of the telephone numbers of the facsimile devices is inputted, as shown in FIG. 4, the liquid crystal display 76 of the display panel 92 displays the telephone numbers of the transmission-side facsimile devices stored in the memory 94.

At step S81, one of the telephone numbers of the transmission-side facsimile devices to be dialed is selected by using the selecting key 72 of the selector 93 for selecting the telephone number of the transmission-side facsimile device. At step S82, the selected telephone number of the transmission-side facsimile device is dialed using the start key 73. If necessary, the dialing of the selected telephone number may be canceled by using the cancel key 74.

Figure 5:
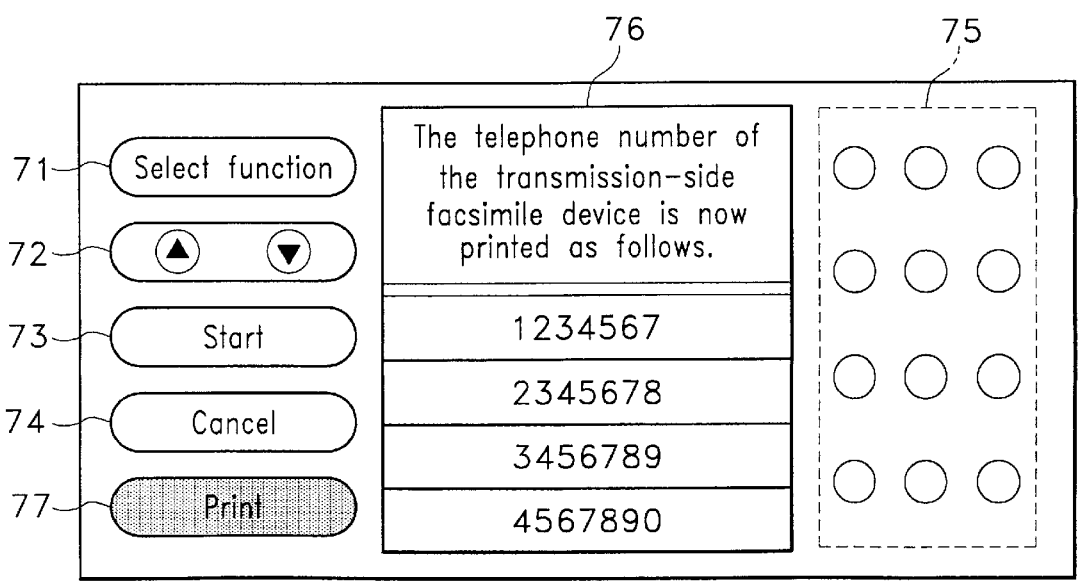
FIG. 5 is a view showing the operation panel of the facsimile device in which a printing of the telephone number of the transmission-side facsimile device is illustrated, in accordance with the principles of the present invention.
Figure 6B:
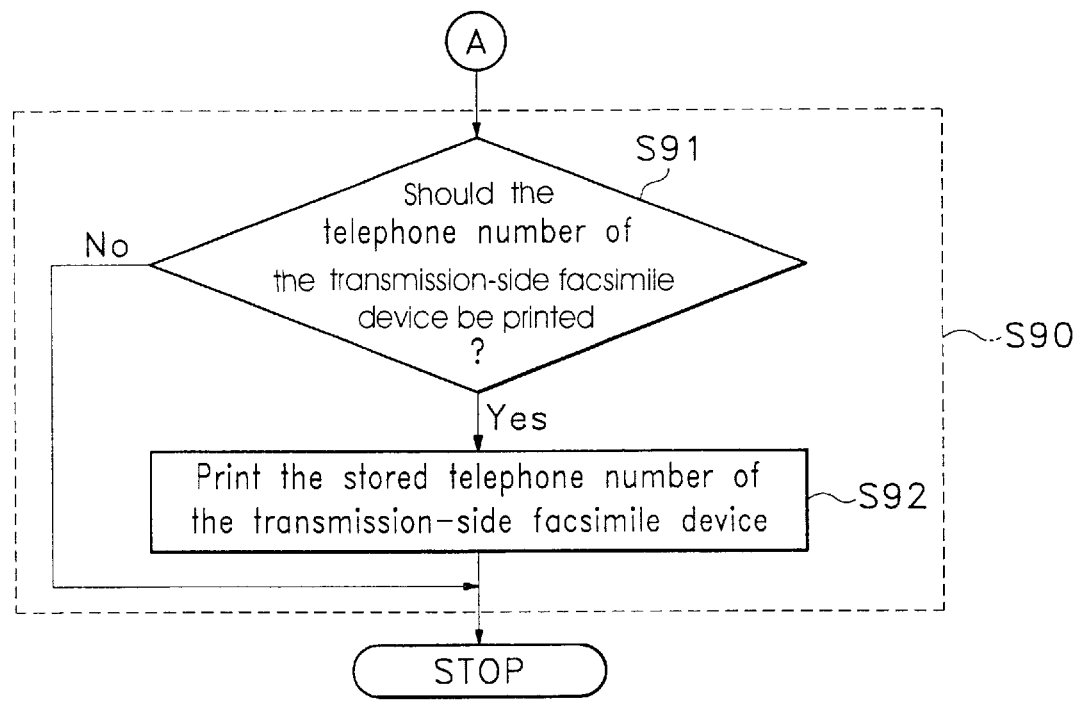

At a step S91, it is determined whether a signal is inputted by using the printing key 77 in order to print the telephone numbers of the transmission-side facsimile devices stored in the memory 94, as shown in FIG. 5. At step S92, if the signal for printing the telephone numbers is inputted by the printing key 77, the controller 91 generates the control signal for printing the telephone numbers of the transmission-side facsimile devices stored in the memory 94 so that the printer 95 prints the telephone numbers of the transmission-side facsimile devices while displaying a message as shown in FIG. 5.

According to the present invention, as described above, as the multifunctional apparatus is connected to the integrated services digital network so as to transfer data, the user need not dial the telephone number of the reception-side facsimile device.

Furthermore, since the multifunctional apparatus facilitates to manage the information for the reception-side facsimile device, the user need not remember or record the telephone numbers of the reception-side facsimile devices.

The display panel 92 shown in FIG. 3 can be a cathode ray tube, a liquid crystal display, a gas-plasma display, a light emitting diode display, an electro-luminescent display, a field emission display, or another type of a video display conveying varying visual information to a user.

The printer 95 shown in FIG. 3 can be an impact dot matrix printer, a thermal inkjet printer, a piezo inkjet printer, a phase-change inkjet printer, an electrophotographic printer, or another type of image forming device able to form an image on a recordable medium. An electrophotographic printer is often referred to as a laser printer.

The foregoing paragraphs describe the details pertaining to a device for dialing and outputting a telephone number of a transmission-side facsimile device, and more particularly to a device for dialing and outputting a telephone number of a transmission-side facsimile device provided through facsimile device for including a device providing a user to user signaling function and an S type interface card and a method for transferring and receiving facsimile data by using the facsimile device.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a memory storing a first telephone number corresponding to a first remote facsimile device, the first telephone number being transmitted from the first remote facsimile device to said memory through an integrated services digital network, and said memory storing a plurality of additional telephone numbers corresponding to a respective plurality of additional remote facsimile devices;

a video display conveying varying visual information to a user, said visual information including the first telephone number corresponding to the first remote facsimile device stored in said memory;

a selector unit selecting the first telephone number displayed on said video display and outputting a selection signal corresponding to the first telephone number;

an image formation unit recording the first telephone number onto a recordable medium; and a control unit outputting a dialing signal for dialing the first telephone number when said selection signal corresponding to the first telephone number is received, and said control unit selectively outputting a control signal to said image formation unit for recording the first telephone number on the recordable medium.

2. The apparatus of claim 1, wherein said video display is selected from among a cathode ray tube, a liquid crystal display, a gas-plasma display, a light emitting diode display, an electro-luminescent display, and a field emission display.

3. The apparatus of claim 1, wherein said image formation unit is selected from among an impact dot matrix printer, a thermal inkjet printer, a piezo inkjet printer, a phase-change inkjet printer, and an electrophotographic printer.

4. The apparatus of claim 1, wherein the first telephone number is stored in said memory in a format corresponding to American standard code for information interchange.

5. The apparatus of claim 1, wherein said selector unit further comprises:

a telephone number selector selecting the first telephone number displayed on said video display;

a dialing section for dialing the first telephone number selected by said telephone number selector; and a cancel section for canceling the dialing of the first telephone number.

6. The apparatus of claim 1, wherein said selector unit further comprises:

a mode selector selecting a mode of using the first telephone number stored in said memory;

a telephone number selector selecting the first telephone number displayed on said video display after said mode is selected by said mode selector;

a dialing section for dialing the first telephone number selected by said telephone number selector; and a cancel section for canceling the dialing of the first telephone number.

7. The apparatus of claim 1, wherein said selector unit further comprises:

a telephone number selector selecting the first telephone number displayed on said video display;

a dialing section for dialing the first telephone number selected by said telephone number selector;

a cancel section for canceling the dialing of the first telephone number; and a print section controlling said control signal selectively output from said control unit for recording the first telephone number on the recordable medium.

8. The apparatus of claim 1, wherein said selector unit further comprises:

a mode selector selecting a mode of using the first telephone number stored in said memory;

a telephone number selector selecting the first telephone number displayed on said video display after said mode is selected by said mode selector;

a dialing section for dialing the first telephone number selected by said telephone number selector;

a cancel section for canceling the dialing of the first telephone number; and a print section controlling said control signal selectively output from said control unit for recording the first telephone number on the recordable medium.

9. A method, comprising:

determining when a communication line is set to be connected to an integrated services digital network;

storing a first telephone number corresponding to a first remote facsimile device when said communication line is set to be connected to the integrated services digital network, the first telephone number being transmitted from the first remote facsimile device through the integrated services digital network;

displaying the first telephone number at a video display conveying varying visual information to a user, said visual information including the first telephone number;

selecting the first telephone number from among a plurality of telephone numbers displayed on said video display and generating a selection signal corresponding to said first telephone number;

outputting a dialing signal initiating dialing of the first telephone number in response to said selection signal; and selectively outputting a control signal initiating recording of the first telephone number onto a recordable medium, said selecting and generating being performed by a selection unit, said outputting of said dialing and control signals being performed by a control unit.

10. The method of claim 9, wherein the first telephone number is stored in a format corresponding to American standard code for information interchange.

11. The method of claim 9, further comprising canceling said dialing of the first telephone number, said canceling of said dialing of the first telephone number being performed when a signal for canceling said dialing of the first telephone number is inputted.

12. An apparatus, comprising:

a memory storing a first telephone number corresponding to a first remote facsimile device, the first telephone number being transmitted from the first remote facsimile device to said memory through an integrated services digital network, and said memory storing a plurality of additional telephone numbers corresponding to a respective plurality of additional remote facsimile devices;

a video display conveying varying visual information to a user, said visual information including the first telephone number corresponding to the first remote facsimile device stored in said memory, and said visual information including said plurality of additional telephone numbers;

a selector unit selecting the first telephone number displayed on said video display and outputting a selection signal corresponding to the first telephone number, said selector unit selecting the first telephone number from among said first telephone number and said plurality of additional telephone numbers; and a control unit outputting a dialing signal for dialing the first telephone number when said selection signal corresponding to the first telephone number is received.

13. The apparatus of claim 12, wherein the first telephone number and said plurality of additional telephone numbers are stored in said memory in a format corresponding to American standard code for information interchange.

14. The apparatus of claim 12, wherein said selector unit further comprises:
   a telephone number selector selecting the first telephone number displayed on said video display;
   a dialing section for dialing the first telephone number selected by said telephone number selector; and
   a cancel section for canceling the dialing of the first telephone number.

15. The apparatus of claim 12, wherein said selector unit further comprises:
   a mode selector selecting a mode of using the first telephone number stored in said memory;
   a telephone number selector selecting the first telephone number displayed on said video display after said mode is selected by said mode selector;
   a dialing section for dialing the first telephone number selected by said telephone number selector; and
   a cancel section for canceling the dialing of the first telephone number.

16. The apparatus of claim 12, wherein said plurality of additional telephone numbers corresponding to said respective plurality of additional remote facsimile devices are all transmitted from said respective plurality of additional remote facsimile devices to said memory through the integrated services digital network.

17. The apparatus of claim 12, further comprising an image formation unit recording the first telephone number onto a recordable medium when a print signal is received from said control unit.

18. The apparatus of claim 17, wherein said image formation unit records the first telephone number and said plurality of additional telephone numbers onto the recordable medium when a print-all signal is received from said control unit.

19. The apparatus of claim 17, wherein said selector unit further comprises:
   a mode selector selecting a mode of using the first telephone number stored in said memory;
   a telephone number selector selecting the first telephone number displayed on said video display after said mode is selected by said mode selector;
   a dialing section for dialing the first telephone number selected by said telephone number selector;
   a cancel section for canceling the dialing of the first telephone number; and
   a print section controlling said print signal selectively output from said control unit for recording the first telephone number on the recordable medium.

20. The apparatus of claim 17, wherein said selector unit further comprises:
   a telephone number selector selecting the first telephone number displayed on said video display;
   a dialing section for dialing the first telephone number selected by said telephone number selector;
   a cancel section for canceling the dialing of the first telephone number; and
   a print section controlling said print signal output from said control unit for recording the first telephone number on the recordable medium.

* * * * *